United States Patent [19]

Egger

[11] Patent Number: 5,684,464
[45] Date of Patent: Nov. 4, 1997

[54] PROCESS AND SYSTEM FOR CONTROLLING A WINDSHIELD WIPER, PARTICULARLY FOR A MOTOR VEHICLE

[75] Inventor: Armin Egger, Bad Homburg, Germany

[73] Assignee: VDO Adolf Schindling AG, Frankfurt, Germany

[21] Appl. No.: 440,193

[22] Filed: May 12, 1995

[30] Foreign Application Priority Data

May 18, 1994 [DE] Germany ............... 44 17 394.6

[51] Int. Cl.$^6$ ............... G08B 21/00; H02P 5/28
[52] U.S. Cl. ............... 340/602; 318/444; 318/483; 318/DIG. 2; 340/601; 340/438; 340/439
[58] Field of Search ............... 318/444, 483, 318/264, DIG. 2; 340/438, 439, 601, 602; 15/250.13, 250.17, 250 C

[56] References Cited

U.S. PATENT DOCUMENTS

| | | | |
|---|---|---|---|
| 4,740,735 | 4/1988 | Hayashi | 318/483 |
| 5,140,233 | 8/1992 | Wallrafen | 318/483 |
| 5,203,207 | 4/1993 | Sukiyama | 340/602 |
| 5,252,898 | 10/1993 | Nolting | 318/444 |
| 5,276,389 | 1/1994 | Levers | 318/444 |
| 5,319,293 | 6/1994 | Levers | 318/483 |
| 5,412,296 | 5/1995 | Chien et al. | 318/444 |
| 5,436,541 | 7/1995 | Mangler | 318/483 |
| 5,453,670 | 9/1995 | Schaefer | 318/444 |

FOREIGN PATENT DOCUMENTS

| | | | |
|---|---|---|---|
| 0443080 | 8/1991 | European Pat. Off. | B60J 1/08 |
| 0565054 | 3/1993 | Japan . | |

*Primary Examiner*—Brent A. Swarthout
*Assistant Examiner*—Van Trieu
*Attorney, Agent, or Firm*—Martin A. Farber

[57] ABSTRACT

A process and a system for controlling a windshield wiper, in particular on a motor vehicle, employs a sensor which recognizes the intensity of the rain. The sensor gives off a signal whereby the windshield wiper is automatically controlled as a function of the intensity of the rain. A variation in the signal of the sensor is effected by random signals produced by the continuous movements of drops of water, and serves as measure for the intensity of the rain. In order to assure an optimal and reliable control of the windshield wiper as a function of the intensity of the rain, there is a monitoring of the time between a first sudden change of the signal and a second sudden change. When the time exceeds a given value, the windshield wiper is controlled as a function of at least an earlier one of the sudden changes in the sensor signal which precedes the aforementioned first sudden change.

11 Claims, 3 Drawing Sheets

PROCESS AND SYSTEM FOR CONTROLLING A WINDSHIELD WIPER, PARTICULARLY FOR A MOTOR VEHICLE

FIELD AND BACKGROUND OF THE INVENTION

The present invention relates to a process and system for controlling a windshield wiper, particularly on a motor vehicle, on which a sensor which recognizes the intensity of the rain gives off a signal, and in which the windshield wiper is automatically controlled as a function of the intensity of the rain, and wherein a variation in the signal of the sensor results from a random aspect of signals produced by continuous movements of drops of water and serves as measure of the intensity of the rain.

Means for controlling windshield wipers are known in which the amount of moisture on the windshield is detected by sensors arranged on the windshield.

When a predetermined amount of moisture is reached on the windshield, the windshield wiper motor is automatically turned on. For optimal vision, it is, however, important to adapt the operation of the windshield wiper to the prevailing intensity of the rain, which can be effected by connection and disconnection, change of the intervals between individual wiping processes, change of the speed and/or switching between intermittent operation (individual wipe) or continuous operation (continuous wiping).

From EP 443 080, a control of the windshield wiper is known which uses the variation in signal of the sensor as measure for the intensity of the rain. In that case, one proceeds from the fact that the continuous movement of rain drops produces random signals which are entirely absent in the event of dryness.

There is the disadvantage here that, upon each measurement, the variation in signal must first of all be set to zero in order to trigger the control signal, and that an increase in moisture on the windshield is determined starting from this. In this connection, the extent to which residual moisture was still on the windshield after the previous measurement is not taken into account.

SUMMARY OF THE INVENTION

It is an object of the invention to provide a process and a system for the optimal and reliable control of a windshield wiper as a function of the intensity of the rain.

According to the invention, when the time (t) between a first sudden change in the sensor signal ($S_m$) and a second sudden change thereof exceeds a given value ($t_k$), the windshield wiper is controlled as a function of at least one sudden change in the sensor signal which precedes the first sudden change.

The advantage of the invention is that the random signals of the drops of rain which have impinged on the windshield are also taken into account for the control of the windshield wiper.

This takes place advantageously in the manner that the starting signal which forms the basis of the measurement process assumes a value other than zero.

According to a feature of the invention, the frequency (n) of the occurrence of the sudden changes in signal is determined within a given time interval and compared with a predetermined frequency (m) of the sudden change of the sensor signal.

According to a further feature, the frequency value (n) ascertained is reduced upon the exceeding of the time ($t_k$) between two events.

Yet the invention provides that, when the predetermined frequency (m) of the sudden changes in the sensor signal is reached, the amplitude of the sudden change of the sensor signal ($S_n$) last detected is compared with a threshold value ($S_{ref}$), wherein upon the dropping below the threshold value, the windshield wiper is actuated.

One advantageous system for the carrying out of the process provides that the sensor is connected via an analog/digital converter (4) to a microcomputer (5), and that a program in accordance with the process of the invention is provided for the microcomputer. In this case, the sensor is preferably a resistive moisture sensor (1).

The invention permits numerous embodiments.

BRIEF DESCRIPTION OF THE DRAWINGS

With the above and other objects and advantages in view, the present invention will become more clearly understood in connection with a detailed description of preferred embodiments, when considered with the accompanying drawing, of which.

DETAILED DESCRIPTION OF THE PREFERRED EMBODIMENTS

Figure 1:
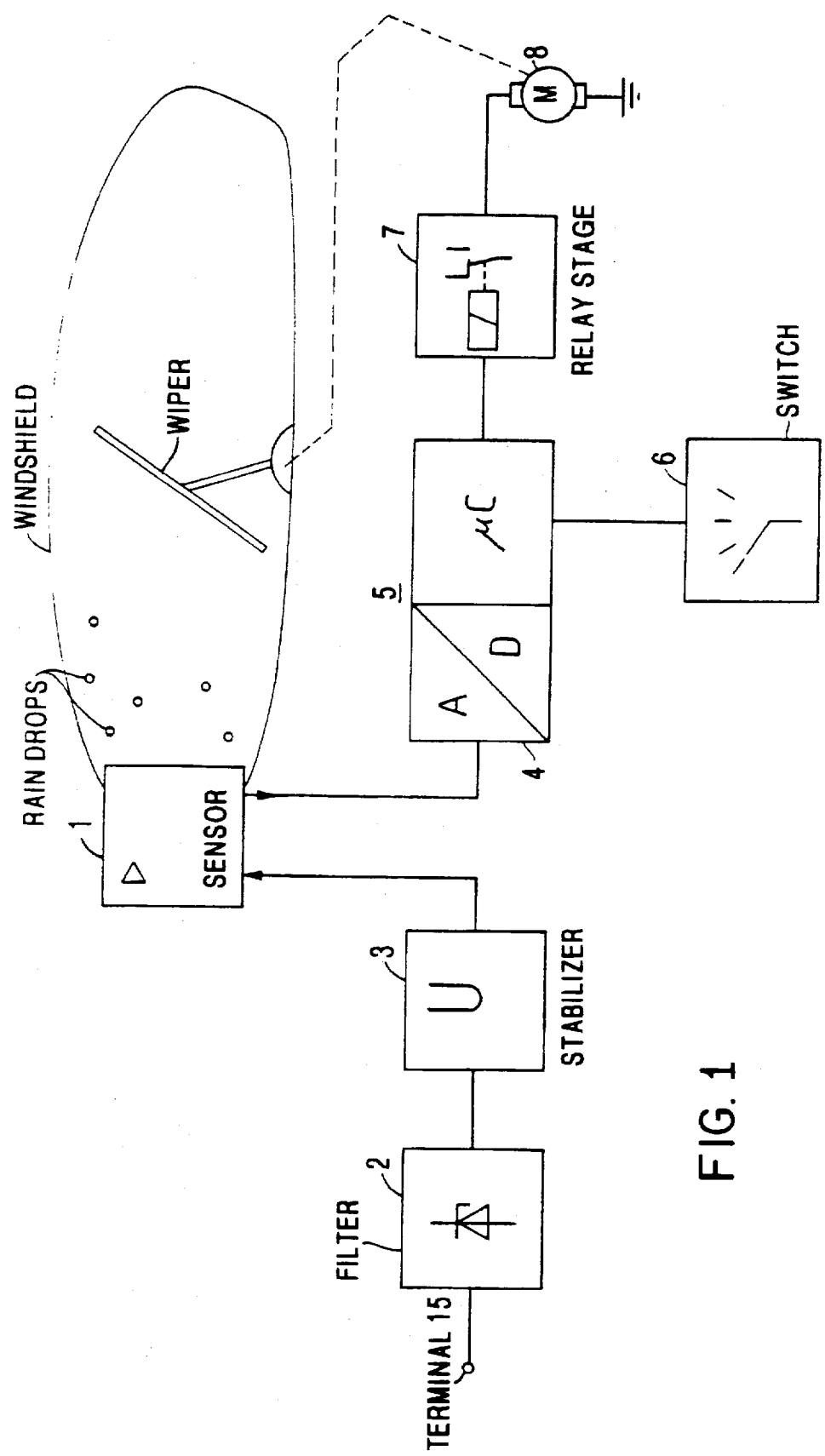
FIG. 1 is a block diagram of a system for the carrying out of the process of the invention.

In the device shown in FIG. 1, the degree of wetting of the windshield is determined by means of a resistive sensor 1 to which operating voltage is fed via the terminal 15 of the car's electrical system via a noise-voltage filter 2 and a stabilizing circuit 3. Resistive moisture sensors are known per se and need not be explained in detail for an understanding of the present invention. An amplifier is associated with the sensor 1 so that the output voltage of the sensor can be fed directly to an analog/digital converter 4 of a microcomputer 5. The microcomputer 5 is connected to an operating switch 6 which is preferably developed as a steering column switch and has detent positions for continuous operation and automatic operation, as well as a momentary-contact position for a single wipe. The motor 8 of a windshield wiper is connected via a relay stage 7 to an output of the microcomputer 5.

Figure 2:
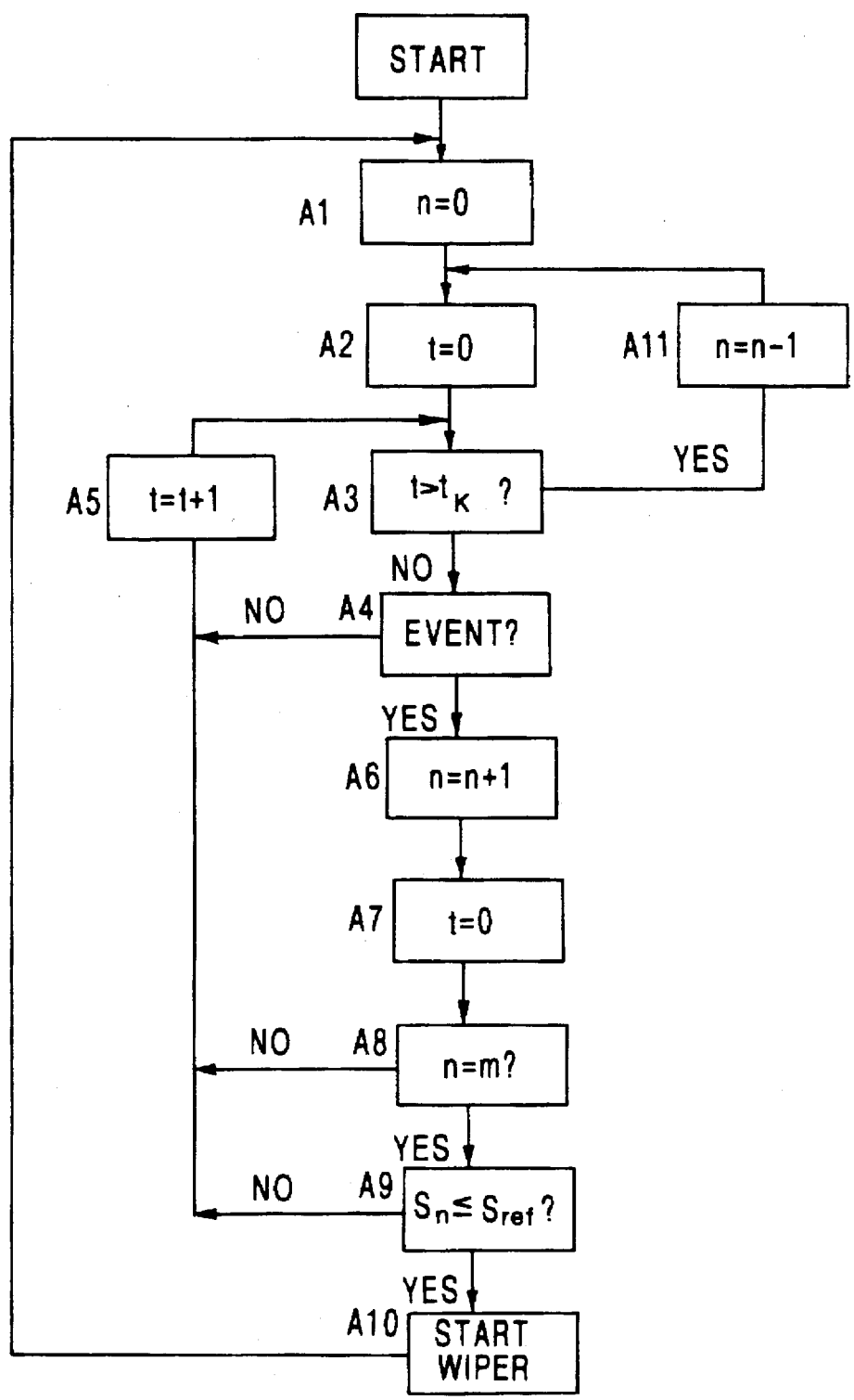
FIG. 2 is a flow chart of a program provided for the microcomputer in the system of FIG. 1.

In the program shown in FIG. 2, the frequency of the occurrence of sudden changes in the signal of the wetness sensor 1 is counted. The occurrence of such sudden change is referred to hereinafter as an "event".

The sudden change in the sensor signal must exceed a certain amplitude in order to be evaluated as an event by the microcomputer 5.

Figure 3:
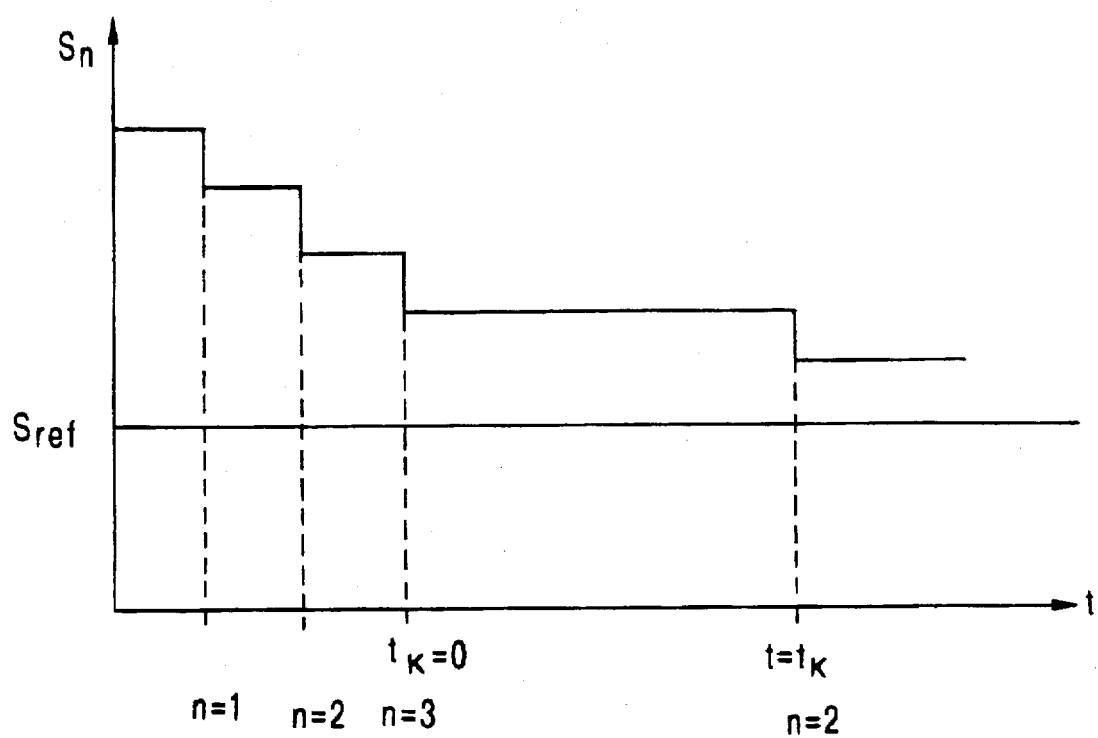
FIG. 3 is a time graph.

Upon a starting of the measurement of wetness, it is assumed that no event is present as yet. This is indicated in step A1 by setting a counter of the computer 5 to a count n=0. A timer of the computer 5 is also set to a time t=0 as shown in step A2. Within a fixed period of time for instance 5 seconds, as indicated by $t_k$ in step A3, it is determined with a sampling period of several milliseconds whether an event is present or not. At step A3, the waiting time for the next event is monitored. Assuming that the time does not exceed $t_k$, the process moves on to step A4 wherein the computer 5 observes the sensor signal to determine if an event has taken place. If no event has taken place, then at step A5 the timer advances for another observation of the sensor signal, and the process reverts to step A3. If the microcomputer notes an event in step A4, the event is counted at step A6. The time which represents the difference between two successive events is reset to zero at step A7. It is then determined in the branching step A8 whether the number of counted events n agrees with the stored number of events m. If so, then the signal value $S_n$ is compared at step A9 with a threshold value $S_{ref}$ known to the microcomputer 5. This threshold value $S_{ref}$ represents the dry windshield. When the threshold value $S_{ref}$ is reached or dropped below by the amplitude of the signal $S_n$, the windshield wiper is started at step A10 on basis of the moisture present. The relationship of the foregoing signals is shown in the graph of FIG. 3.

If the criteria established in the branching at step A8 or A9 are not satisfied, as is the case with the branching at step A4, then it is checked at step A3 whether the time between the occurrence of two events has reached the given value $t_k$. If the time $t_k$ is exceeded, i.e. the time between the occurrence of two events is too long, then the number of events already counted is reduced by 1 at step A11. This is shown in FIG. 3.

In this way, assurance is had that, for instance, in the event that only a few raindrops impinge on the windshield within relatively long time intervals, these drops are, counted but they do not lead to a starting signal for the windshield wiper.

By means of the time criterion introduced in accordance with the invention, the control of the windshield wiper as a function of the residual moisture present on the windshield is optimized.

I claim:

1. A method for controlling a windshield wiper, suitable for use on a motor vehicle, the method employing a sensor which recognizes the intensity of rain on a windshield and gives off a signal, the signal enabling the windshield wiper to be automatically controlled as function of the intensity of the rain, and wherein a variation in the signal of the sensor is manifested as random signals produced by the presence of continuous movements of drops of water and serves as measure for the intensity of the rain; the method comprising steps of:

in a sequence of sudden changes in the sensor signal, observing time elapsed between one of said sudden changes in the sensor signal and a later sudden change thereof exceeding a given value; and controlling the windshield wiper as a function of at least an earlier one of said sudden changes in the sensor signal which precedes said one sudden change during the elapsed time between the occurrence of the sudden changes.

2. A method according to claim 1, further comprising a step of determining the frequency of occurrence of the sudden changes in the sensor signal within a given time interval; and comparing the occurrence frequency with a predetermined frequency of the sudden changes of the sensor signal.

3. A method according to claim 2, further comprising a step of reducing the occurrence frequency upon the elapsed time exceeding the given value.

4. A method according to claim 3, further comprising a step of upon an obtaining of the predetermined frequency of the sudden changes in the sensor signal, comparing the amplitude of a subsequent sudden change of the sensor signal with a threshold value; and upon a dropping of the signal change amplitude below the threshold value, actuating the windshield wiper.

5. A method according to claim 1, wherein said controlling step includes a step of counting such ones of the sudden changes which are spaced apart in time by an interval less than or equal to $t_k$ to obtain a count of the sudden changes, and a step of decrementing the count upon the occurrence of the time interval having a value greater than $t_k$.

6. A system for operating a windshield wiper, suitable for use on a motor vehicle, comprising:

a sensor of intensity of rain on a windshield;

a computer, and an analog/digital converter connecting said sensor to said computer;

wherein said computer is operative in accordance with a program providing a process for controlling the windshield wiper, the process employing said sensor to give off a signal enabling the windshield wiper to be automatically controlled as a function of the intensity of the rain, and wherein a variation in the signal of the sensor is manifested as random signals produced by the presence of continuous movements of drops of water and serves as measure for intensity of the rain; and the process provides for observing, in a sequence of sudden changes in the sensor signal, a time elapsed between one of said sudden changes in the sensor signal and a later sudden change thereof exceeding a given value, and controlling the windshield wiper as a function of at least an earlier one of said sudden changes in the sensor signal which precedes said one sudden change during the elapsed time between the occurrence of the sudden changes.

7. A system according to claim 6, wherein the sensor is a resistive moisture sensor.

8. A method of operating a rain sensor for actuating a device controlled by the sensor, wherein a change in a signal outputted by the sensor is considered to be an event, comprising the steps of:

starting an observation interval for observation of events in a sequence of events;

checking whether an event occurred within the observation interval;

upon occurrence of an event within said observation interval, counting the event, terminating the observation interval, and initiating a further observation interval to establish a sequence of said observation intervals, there being no more than one event per observation interval;

counting further events occurring within further intervals of said sequence of observation intervals;

measuring a magnitude of the signal of an event occurring subsequent to attainment of a predesignated count in said counting step; and actuating said device upon attainment of a predetermined signal magnitude in said measuring step.

9. A method according to claim 8, wherein in said counting step, there is an incrementing of said count upon the presence of an event of said event sequence in an interval of said sequence of observation intervals;

the method further comprises a step of initiating a further one of said observation intervals; and a decrementing of said count upon the absence of an event of said event sequence in an interval of said sequence of observation intervals.

10. A method according to claim 9, wherein said measuring step comprises a comparing of the signal magnitude to a threshold.

11. A method according to claim 10, wherein said device is a windshield wiper, and said actuating step comprises a controlling of an operating speed of the wiper.

* * * * *